United States Patent
Johnson

(10) Patent No.: US 6,169,979 B1
(45) Date of Patent: *Jan. 2, 2001

(54) COMPUTER-ASSISTED SALES SYSTEM FOR UTILITIES

(75) Inventor: Jerome D. Johnson, North Mankato, MN (US)

(73) Assignee: Clear With Computers, Inc., Mankato, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/024,792

(22) Filed: Feb. 17, 1998

Related U.S. Application Data

(63) Continuation of application No. 08/290,190, filed on Aug. 15, 1994, now Pat. No. 5,758,331.

(51) Int. Cl.[7] .................................................... G06F 17/60
(52) U.S. Cl. ............................. 705/412; 705/7; 705/30; 705/400
(58) Field of Search ........................ 364/528.26, 528.3; 705/1, 7, 11, 30, 35, 400, 412

(56) References Cited

U.S. PATENT DOCUMENTS

| | | | |
|---|---|---|---|
| 4,190,800 | 2/1980 | Kelly, Jr. et al. | 325/37 |
| 4,253,151 | * 2/1981 | Bouve | 364/528.3 |
| 4,306,293 | * 12/1981 | Marathe | 364/528.26 |
| 4,324,987 | 4/1982 | Sullivan, II et al. | 307/35 |
| 4,336,462 | 6/1982 | Hedges et al. | 307/35 |
| 4,370,723 | * 1/1983 | Huffman et al. | 364/528.3 |
| 4,585,904 | 4/1986 | Mincone et al. | 179/7.1 TP |
| 4,751,728 | 6/1988 | Treat | 379/113 |
| 4,803,632 | * 2/1989 | Frew et al. | 705/412 |
| 5,216,623 | * 6/1993 | Barrett et al. | 702/62 |
| 5,237,507 | * 8/1993 | Chasek | 705/412 |
| 5,283,829 | 2/1994 | Anderson | 380/24 |
| 5,519,622 | * 5/1996 | Chasek | 705/412 |
| 5,528,507 | * 6/1996 | McNamara et al. | 364/528.21 |
| 5,627,759 | * 5/1997 | Bearden et al. | 702/62 |
| 5,758,331 | * 5/1998 | Johnson | 705/412 |
| 5,768,148 | * 6/1998 | Murphy et al. | 364/528.21 |
| 5,805,458 | * 9/1998 | McNamara et al. | 340/870.02 |
| 5,818,725 | * 10/1998 | McNamara et al. | 340/870.02 |
| 5,930,773 | * 7/1999 | Crooks et al. | 705/30 |

OTHER PUBLICATIONS

"Conservation is the way of the future . . .", *MORE Systems, Inc.*: 6 pgs (Date unknown).

"Energy Savings Plan Report", *SCR Systems Inc.*, Metro Gas & Electric, Prepared for: Gladys Smith, World Realty Corp:10 pgs. (Feb. 13, 1993).

"InSite® Product Description: The First Fully Integrated DSM and Marketing Information System", *ENERGY,* Front cover, Table of Contents and pp. 1–15 (Date unknown).

"InSite® Standard Report Examples", *ENERGY:* 21 pgs. (Date unknown).

(List continued on next page.)

*Primary Examiner*—Edward R. Cosimano
(74) *Attorney, Agent, or Firm*—Merchant & Gould P.C.

(57) ABSTRACT

A computer-based system for generating customized proposals relating to consumption and cost of utilities. The system receives and stores information related to a utility company's services and conservation programs, utility rates, and a customer's inventory. The system processes this information in order to determine how various factors and parameters will affect the customer's utility consumption and cost. As a result of this processing, the system generates a customized proposal for the customer relating to how the customer can reduce consumption and cost of utilities.

50 Claims, 4 Drawing Sheets

Microfiche Appendix Included
(5 Microfiche, 440 Pages)

OTHER PUBLICATIONS

"Market Manager™ Energy Analysis System for WIndows User's Manual", *SRC Systems, Inc.:* Front cover, Table of Contents, and pp. 1–8 (Date unknown).

"Technical Brief®", *EPRI:* 2 pgs. (Jan. 1994).

"The Fastest Vehicle to Sales and Profits on the GM Information Superhighway: Introducing GM PROSPEC": 37 pgs. (Date unknown).

"The New Standard in Energy Analysis Software", *SRC Systems, Inc.:* 2 pgs. (Date unknown).

* cited by examiner

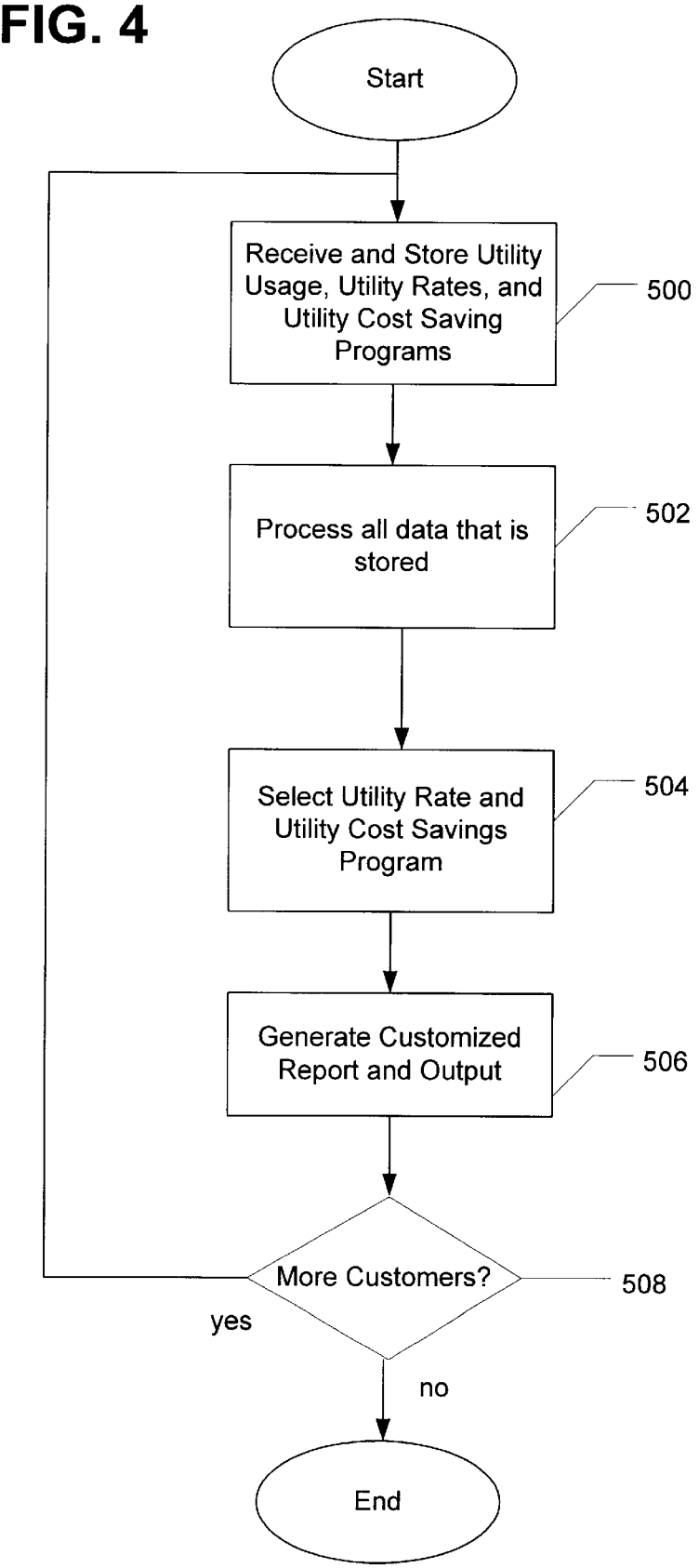

COMPUTER-ASSISTED SALES SYSTEM FOR UTILITIES

This application is a continuation of application Ser. No. 08/290,190, now U.S. Pat. No. 5,758,331, filed on Aug. 15, 1994. This application includes a microfiche appendix containing 5 sheets of microfiche and 440 frames.

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a computer-based system for generating a customized proposal relating to consumption and cost of utilities.

BACKGROUND OF THE INVENTION

Utility companies face many challenging demands as power, fuel, and other utility product or service consumption increases. The utility companies must monitor consumption of the products and services to ensure that sufficient capacity for power output and/or that sufficient amounts of fuel or other products are available in order to best use existing capacity. If power or other product or service consumption in a particular city or region serviced by a utility company exceeds the utility company's capacity to deliver the product or service, then the company may only have very expensive options available for meeting the demand. The company can build another power, fuel or other plant, or could buy power from another utility. Due to the expense of these options, the utility company would prefer to encourage customers to limit consumption of its products and services.

Utility companies therefore often make sales type presentations to customers to encourage reduction and control of consumption. The company may encourage this by showing how reduction in consumption may significantly reduce cost to the customer. The company may also offer rebates to further encourage power consumption. In addition, the company may propose strategies and techniques for the customer to reduce consumption. For example, more energy efficient lighting for a businesses may be recommended.

In making such sales presentations, utility companies have had limited tools. Sometimes pre-printed brochures are available. However, these are not customer specific and therefore do not address the specific needs of particular customers. Also, the salespersons may each use their own formulas for calculating numbers related to power or other consumption and cost, which means that the company has no standardized formulas or methods of calculation related to utilities. In addition, the salespersons must typically calculate the formulas by hand, which limits their ability to provide information to the customers quickly and efficiently.

Therefore, a need exists for a system that assists utility companies in generating customized proposals related to consumption and cost of products and services provided by utilities.

SUMMARY OF THE INVENTION

The present invention comprises a computer-assisted sales system for utilities. A utility company can use the system in order to generate a customized proposal related to how the customer can reduce consumption and cost of utilities. The system receives and stores information related to a utility company's services and conservation programs, utility rates, and a customer's inventory and general identification. The system processes this information in order to determine how various factors and parameters will affect the customer's utility consumption and cost of products and services provided by utilities. As a result of this processing, the system generates a customized report or proposal for the customer.

BRIEF DESCRIPTION OF THE DRAWINGS

FIG. 4 is a flow chart of the operations performed within the computing system according to one possible embodiment of the present invention.

DETAILED DESCRIPTION OF THE PREFERRED EMBODIMENT

Figure 1:
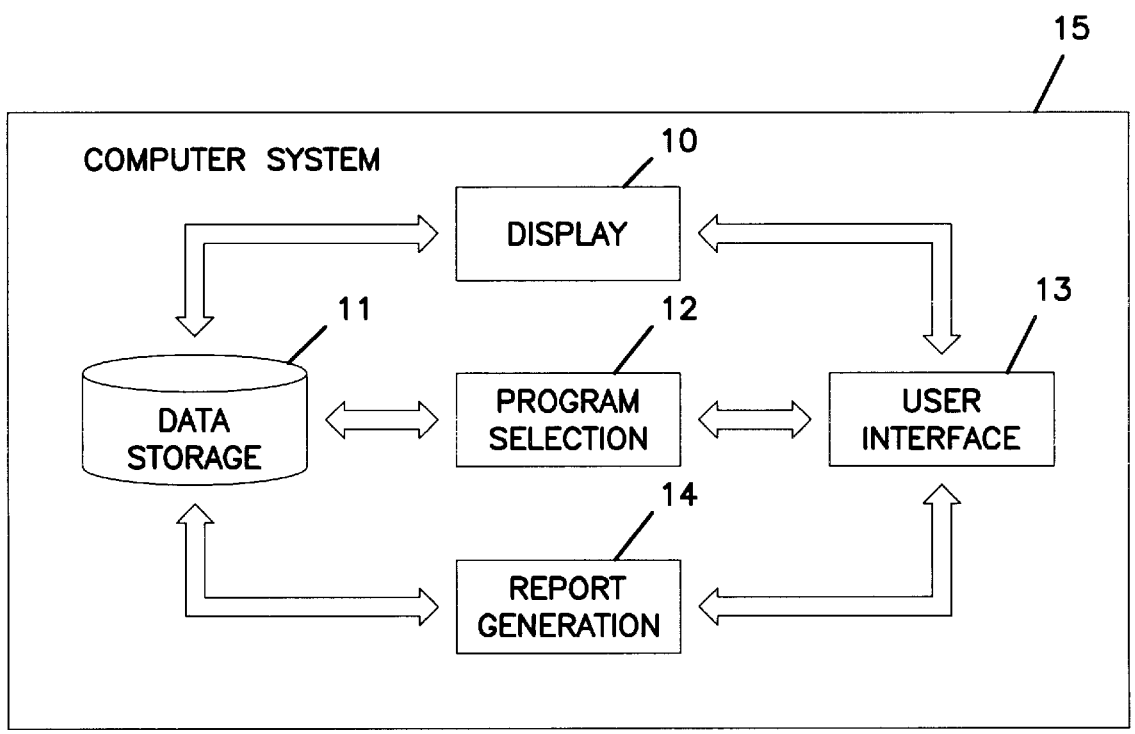
FIG. 1 is a block diagram showing a preferred computer hardware structure for the present computerized system.

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Overview

The present invention comprises a computer-assisted sales system for utilities. A utility company can use the system for generating a customized proposal related to how the customer can reduce consumption and cost of products and services delivered by utilities. The system can receive and store information related to a utility company's services and conservation programs, utility rates, and a customer's inventory and general identification. The system processes this information in order to determine how various factors and parameters will affect the customer's utility consumption and cost. These factors are explained below and may include, for example, different rates, more energy efficient equipment, and rebates. As a result of this processing, the system generates a customized proposal for the customer.

The example illustrated in the present specification is an embodiment for use by a power utility. The present invention, however, applies to utilities in general, which may include, for example, power, gas, electricity, light, water, or steam.

This system has many advantages. A user can dynamically generate various proposals, either electronically on line or in printed, electronic, optical, or other media format, to show customers how to reduce consumption of utilities and thus save cost. For example, the system can provide immediate feedback by generating graphs to show the effect of different rates on cost. In addition, the system can illustrate conservation programs of a utility company and process the customer's data to show the effect of the conservation programs on utility consumption and cost. The system can also inventory a customer's equipment and process this information in order to provide immediate feedback regarding how different equipment results in reduced consumption and hence lower cost to the customer. The system can process all of this information in order to assemble it into a customized proposal for the customer. The system can typically be implemented on a laptop computer so that a salesperson can easily transport the system and use it while meeting with customers in order to provide the feedback described above and actually generate a customized proposal for the customer as a part of the sales presentation. As previously indicated, the proposal delivered can be in paper, electronic (e.g., on magnetic computer disk), optical (e.g., on optically read disks), or other format. The proposal can also be transmitted electronically directly to another computer, such as via a communication link to a computer at the customer's facility.

The proposal may include various reports and information regarding the customer's utility consumption and further specify how this particular customer can reduce cost. These proposals can be generated either on line or in printed format. The present invention thus provides for a powerful tool that utility companies can use in making in generating proposals for customers.

The quality of the pictures or graphics produced in these customized, printed proposals can be made comparable in quality to the glossy photographs in prior art proposals due to recent advances in computer printers and displays. Printers such as the Canon CLC-300 produce color computer print-outs that resemble color photographs. These customized proposals, therefore, need not be inferior to prior art proposals in terms of the quality of available pictures for the proposals.

Examples of system for generating customized proposals are described in U.S. Pat. No. 5,283,865, U.S. patent application Ser. No. 07/878,602 filed May 5, 1992now U.S. Pat. No. 5,493,490, and U.S. patent application Ser. No. 08/268, 166 filed Jun. 29, 1994, now U.S. Pat. No. 5,625,776, all of which are assigned to Clear With Computers, Inc. and are incorporated herein by reference as if fully set forth.

System Modules

FIG. 1 is a block diagram of a preferred computer hardware system 15 for implementing the software processing of the sales system. Computer system 15 may be implemented with a wide variety of computers, such as desktop or laptop computers. A preferred embodiment uses a laptop or notebook computer so that salespersons may easily transport the system and use it while making sales presentations, for example, at a customer's facility.

A data storage device 11 electronically stores both graphic and textual information related to consumption and cost of products or services provided by utilities, see FIG. 4 step 500. A user interacts with the system through a user interface apparatus 13. A display apparatus 10 electronically displays the information stored within the data storage 11. A report generation apparatus 14 is used for generating customized reports or proposals based on the stored information. The reports or proposals may be generated either on-line or in a hard copy format, or in electronic, optical, or similar formats. A program selection apparatus 12 processes the entered and stored information for use in generating customized proposals.

Figure 2:
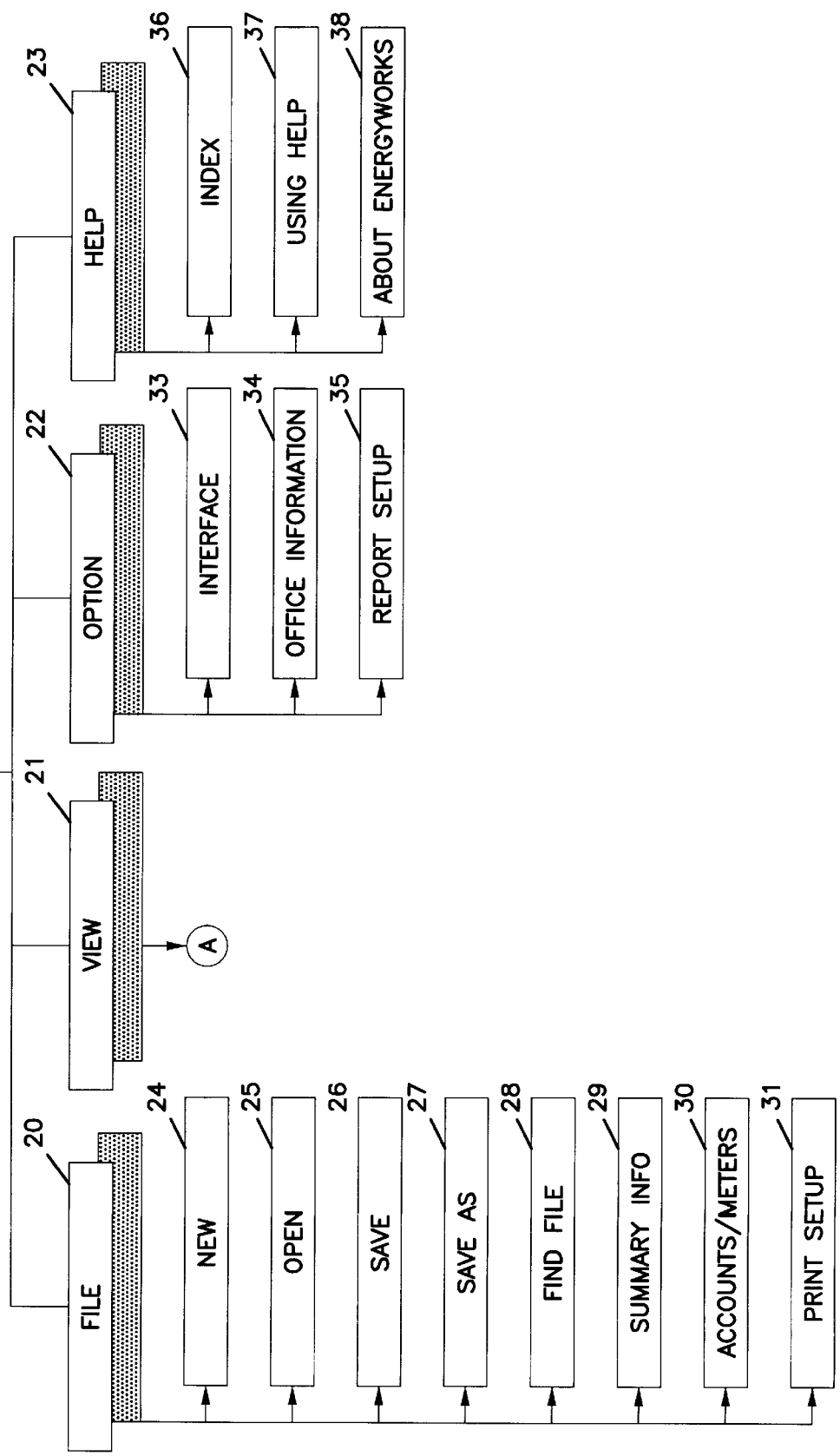
FIGS. 2 and 3 are a flow chart showing the preferred structure and operation of the system within a computer.
Figure 3:
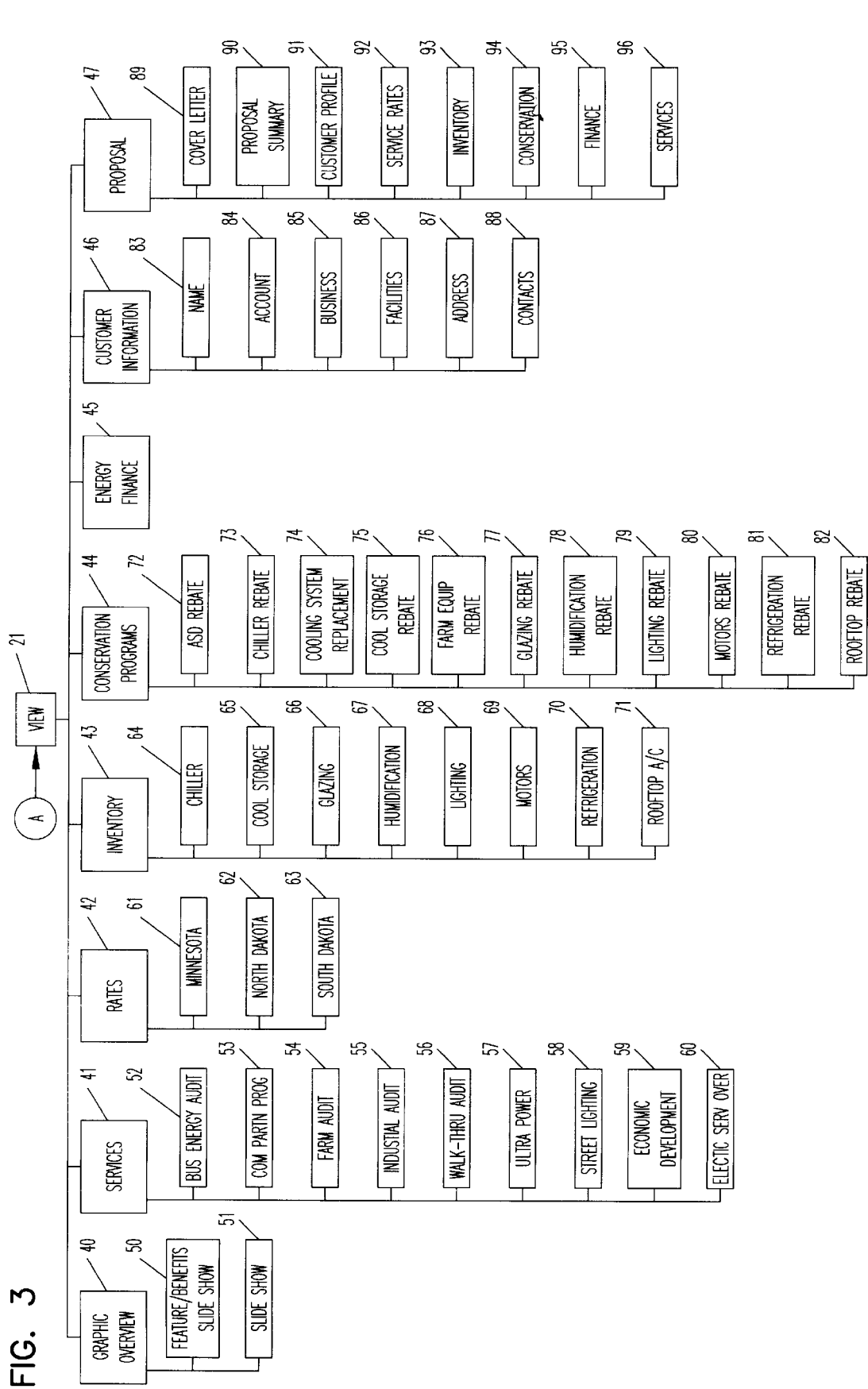

FIGS. 2 and 3 illustrate a preferred structure for modules of software executed by the system. The system 18, including the software processing, is also referred to in the present specification as "utilities system" (ENERGYWORKS). A first level of modules preferably includes file 20, view 21, option 22, and help 23, which may be selected by a user. The file function 20 includes typical functions related to file management, such functions related to the following: opening a new file (24); opening a saved file (25); saving a file (26); saving a file under a new name (27); searching the database for a file (28); providing summary information related to particular files (29); accounts and meters (30); and setting up a printing function (31).

The option function 22 typically includes functions related to the interface (33), office information (34), and setting up reports or proposals (35). The help function 23 typically including such functions as indexing (36), and information about the help function (37) and the system (38).

FIG. 2 illustrates a preferred structure for the sub-modules within the view module 21, which performs the primary processing, see FIG 4 step 502 and 504, of entered and stored information for use in generating customized reports or proposals. The view module 21 preferably includes the following sub-modules or functions. A graphic overview module 40 includes features and benefits slide shows (50) and other slide shows 51. These slide shows may repeatedly display a particular show about the system, which may be used, for example, on a stand-alone display or to introduce users to the product.

A services module 41 interacts with help text to display and provide information about a utility company's services. This may comprise displaying textual information on the display. The services may include, for example, those which are offered by Northern States Power Co. in Minnesota, such as the following: business energy audit (52); "com partner" program (53); farm audit (54); industrial audit (55); walk-thru audit (56); ultra power (57); street lighting (58); economic development (59); and "electric serv over" (60).

A rates module 42 performs processing of entered and stored data in order to calculate, for example, the effects of varying utility rates. These calculations may use predetermined formulas for rates in various states, such as Minnesota (61), North Dakota (62), and South Dakota (63), or any other predetermined geographic region. The rates module 42 allows the system to, for example, dynamically calculate and then display how different rates can result in cost savings to utility company customers. This provides a powerful tool in providing immediate feedback to customers without having to perform hand calculations. The display of sample graphs showing the results of rate calculations are provided in the user interfaces in the microfiche appendices (see Table 1). In addition, source code for exemplary rate calculations and formulas for the rates module 42 is provided in the microfiche appendices (see Table 1).

The inventory module 43 allows a user to enter into the database 11 information identifying and related to a customer's inventory. The system may then use this information in calculating the effects of the various inventory on consumption and cost of products and services provided by the utility. For example, new or more energy efficient equipment may result in lowered power consumption and hence a cost savings. Preferred user interfaces for entering inventory are provided in the microfiche appendices (see Table 1). The inventory, for example, is made up of devices and processes used by the customer such as chiller (64), cool storage (65), glazing (66), humidification (67), lighting (68), motors (69), refrigeration (70), and rooftop A/C (71).

A conservation programs module 44 may store information related to a utility company's energy conservation programs. Module 44 also preferably performs processing to show the effects of implementing the conservation programs on power consumption and cost. These conservation programs may include, for example, those which are offered by Northern States Power Co. in Minnesota, such as the following: ASD (adjustable speed drive motor) rebate (72); chiller rebate (73); cooling system replacement (74); cool storage rebate (75); farm equipment rebate (76); glazing rebate (77); humidification rebate (78); lighting rebate (79); motors rebate (80); refrigeration rebate (81); and rooftop rebate (82). For example, the glazing rebate (77) provides a rebate on energy cost if the customer installs a particular film on windows to reduce power consumption; the humidification rebate (78) provides a rebate on energy cost for adjusting a humidity level in buildings to reduce energy consumption, and a lighting rebate (79) may provide a rebate for using more energy efficient rebate. The other types of rebates may provide a cost savings or rebate based on the installation of more energy efficient equipment. Source code for exemplary calculations and formulas which may be used by the conservation program modules 44 is provided in the microfiche appendices (see Table 1).

A finance module 45 is used by those utility companies which finance, for example, their own energy conservation programs. This may be implemented with a typical finance programs which are well-known in the art.

A customer information module 46 gathers information about customers and may store it in database 11. Such information may include, for example: name (83); account (84); business (85); facilities (86); address (87); and contacts (88). The customer information module 46 may also receive or download such information from a computer database of the customer, which eliminates the need to re-enter large amounts of data. Preferred user interfaces for the customer information module 46 are provided in the microfiche appendices (see Table 1).

A proposal module 47 gathers information from the database 11 and generates customized proposals for customers, see FIG 4 step 506. The module 47 typically interfaces with a word processing program in order to print out the report or proposal. A preferred embodiment interfaces with Microsoft Word for printing a report or proposal. The module 47 allows a user to select various parts of a report or proposal, which the module 47 then assembles and generates. These parts of the report or proposal may include, for example, the following: a cover letter (89); proposal summary (90); customer profile (91); service rates (92); inventory (93); conservation (94); finance (95); and services (96). Examples of a typical customized proposal, and a proposal which includes all available reports for an exemplary collection of reports, are included within the appendices. The typical proposal would usually only contain selected reports from the exemplary collection of reports. Preferred user interfaces for the proposal module 47 are also provided in the appendices.

Table 1 provides a summary of the contents of the microfiche appendices to the present specification. The user interfaces are compiled in the order in which they would generally appear within each module of the system. These represent preferred user interfaces and one example of how the system may be implemented.

TABLE 1

| Appendix | Contents |
|---|---|
| A | Sample typical proposal. |
| B | Sample proposal with all reports from an exemplary collection of reports. |
| C | Source code for rates calculations. |
| D | Source code for miscellaneous calculations, a textual description of which is provided in the sample proposals. |
| E | Main screen user interfaces for the system. |
| F | Exemplary user interfaces related to the graphics functions (40). |
| G | User interfaces for the rates module 42. |
| H | User interfaces for the inventory module 43. |
| I | User interfaces for the conservation module 44. |
| J | User interfaces for the finance module 45. |
| K | User interfaces for the customer module 46. |
| L | User interfaces for the proposal module 47. |

System On-Line Sales Process

The following explains and illustrates the operation of the system for a typical sales process. Table 2 provides an outline of the typical sales process explained below. For definitions of system terms, see Table 3 below. This typical sales process is also illustrated by the corresponding user interfaces in the microfiche appendices.

TABLE 2

| Topic | Subroutines |
|---|---|
| 1. | Get started with utilities system: |
| | a. Start your system |
| | b. Customize utilities system |
| | c. Make menu selections |
| | d. Work with dialog boxes |
| | e. Create cover letter templates |
| | f. Get help from this system |
| 2. | Prepare for your sales call: |
| | a. Prepare utility company mainframe information for use in your presentation |
| | b. Create a new presentation |
| | c. Review your customer's current situation |
| | d. Review and select graphic slides to view with your customer |
| 3. | Make a recommendation: |
| | a. Compare service rate alternatives |
| | b. Record inventory of existing equipment |
| | c. Recommend conservation programs |
| | d. Calculate finance payments |
| | e. Support your recommendation with additional information |
| | f. Support your recommendation with overview graphics |
| | g. Propose utility company services |
| | h. Save your presentation |
| | i. Print your proposal |
| 4. | Make your presentation: |
| | a. Recall a presentation |
| | b. Present your recommendations |
| | c. Save your presentation |
| | d. Print your proposal |
| 5. | Maintaining your presentations and files: |
| | a. Manage your files |
| | b. Set system options |

TABLE 2-continued

| Topic | Subroutines |
|---|---|
| 6. | Reference information: |
| | a. Definitions |
| | b. Error messages |

Create a New Presentation

In a utilities system, customer information and recommendations are organized into a presentation for each customer. Each presentation you create contains current customer data, consumption history, and rate information which is used for your recommendations. Because utilities system operates on the computer, every presentation you make can be saved as a computer file. You can refer to these files again and again to make and save any changes or updates you make to your presentations.

You can begin to create an accurate presentation with just a few easy steps: 1) Select New under the utilities system File menu. 2) The Import Accounts screen will display the account listing from the last mainframe file you used. To select a different mainframe file, click on the mainframe File button. To create a presentation for a customer where you do not have mainframe information available, click OK without choosing an account. 3) Select the account you want to use in your presentation by clicking the Add button and clicking OK.

Accounts/Meters

The Accounts/Meters dialog box allows you to select the accounts and meters you want to work with in your customer presentation. The top window of this dialog allows you to select or enter an account and the bottom window allows you to select specific meters to the presentation. If no accounts or meters are available, you may add accounts and meters: Click the Import mainframe button to bring account information from an mainframe file into your presentation. Click the New button to add accounts and meters when no mainframe information is available.

You may also edit or delete accounts and meters from your presentation. Select the account or meter you want and click the Edit or Delete button. When you delete an account from your presentation, it remains a part of the mainframe file. If you delete an account from your presentation accidentally, you can recover it by starting a new presentation.

See also: Create a new presentation; utilities system online reference.

Account

You can add an account to the system by entering an account number and account name. You can also edit an account number or description with the cursor. Click the OK button after you have entered this information.

See also: utilities system online reference.

Import Accounts

The Import Accounts dialog box allows you to import accounts into your presentation. The upper window in the dialog box contains available accounts for importing. To add an account to your presentation, select it and click the Add button. If you want to add all the accounts in the top list box into your presentation, click on the Add All button. The bottom list box shows the accounts that are available to your presentation.

To remove an account from your presentation, select the account in the lower window of the dialog box, and click Remove. You will only be able to remove the account from your presentation. The information will remain as a part of the mainframe file. If the account you want to import is not listed in the selected file, click on the mainframe file button to list additional files. Click on another file to list the accounts in that file.

See also: Create a new presentation; utilities system online reference.

File Open

The File Open dialog box allows you to open the utilities system presentation files you have saved. When you save your files and use the default directory utilities system installs for you, these defaults will be in place when you use utilities system. If you save your presentations outside the default directory, you can find your presentations by selecting the correct drive and directory. Click the Find File . . . button if you need more help finding your files.

File Name: Type or select the name of the file you want to open. This box lists files with the extension you select in the List Files Of Type box. To see a list of files with a particular extension, type an asterisk "*", a period and the three-character extension.

List Files Of Type: Select the type of file you want to see in the list box. Utilities system Presentations (*.ew1) Lists all files in the current directory saved with an .EW1 extension. All Files (*.*) Lists all files in the current directory.

Drives: Select the drive in which utilities system stores your presentation files.

Directories: Select the directory in which utilities system stores your presentation files.

Find File: Closes the Open dialog box and opens the Find Presentation dialog box so you can search for the location of your presentation files.

See also: Create a new presentation; Recall a presentation; utilities system online reference.

Find Presentation

The Find Presentation dialog box helps you find presentations you want to review. The list box on the left side of the Find Presentation dialog box shows you the presentations you have created in utilities system. The information on the right side of the dialog box is a summary of the highlighted presentation listed on the left. There are several buttons at the bottom of the dialog box that you can use to help you find your presentations.

See also: Filter button; Sort button; Location button; Copy button; Recall a presentation; utilities system online reference.

Filter

The Filter dialog box allows you to reduce the number of presentations by:

Customer Name: If you want to find presentations by customer name, you can do it by selecting a customer name or a range of customer names. Selected—uses the pull-down menu to select the name of the customer whose presentations you want to select. Range—defines a range of customer names, such as "From: A To: M," to select the presentations with customer names that begin with the letters a through m.

Date: You can define a range to display your presentations by date, also. Type the dates using the format: "xx/xx/xx." The Find Presentations dialog box will then display only the presentations within this range of dates.

Salesperson: Use the pull-down menu to select presentations by the name of the salesperson who created them. If your name does not appear in the pull-down menu, add it to the list of salespeople by choosing Office Information from the menu bar and clicking the Edit button. Click the New button from the Salespeople dialog and type your name.

See also: Recall a presentation; utilities system online reference.

Sort

If you have created many presentations, it will be easier to find the presentation you want to work with by sorting them. Choose the sort criteria that fits your needs and click OK. You can sort your presentations in the Find Presentation dialog box by: Date; Salesperson; Customer; File Name; Presentation Title.

See also: utilities system online reference.

Location

You can use this dialog box to find your presentations by clicking on the drive and directory that store your presentations. If you still have difficulty finding your presentations, use the File Manager to find them. Choose Search under the File menu and search for "*.EW1." This will list the utilities system files you are looking for and the directory that stores them.

See also: utilities system online reference.

Copy To

This feature is valuable for saving your presentations on disk. This disk can then be used as a backup or for loading presentations onto another computer. You can use this dialog box to make copies of your presentations by double-clicking on the drive in which you want to store your presentations. This will display a list of all directories for that drive. Double-click on a directory to display a list of sub-directories. Click on the sub-directory in which you want your presentation stored.

See also: utilities system online reference.

Summary Info

Use this dialog box to attach a title and your presentation name to your presentation. Type the title of your presentation in the title box and use the pull-down menu to choose your name.

See also: utilities system online reference.

Customer Information

The reports that you print out for your customer are important in communicating your proposed recommendations. The items in the Customer Information module come from the account you selected when you began your presentation. The Customer Information module allows you to review or edit this information regarding the client's business. The Customer Information module displays information for you in several areas of the screen.

Click on the buttons at the top of the screen to make changes to the customer information. Click on the Close key to leave this work area. When you select the Name button, you can enter information that will appear at the top of your reports. Use the tab key to move from one field to another. If you choose not to enter information, utilities system will insert information from the account that is active at the time you print.

Account: Click on the graphic at left for instruction on entering information on your customer's account.

Business: Click on the graphic at left for instruction on entering information about your customer's business.

Facility: Click on the graphic at left for instruction on entering information about your customer's facility.

Address: Click on the graphic at left for instruction on entering information about your customer's address.

Contacts: Click on the graphic at left for instruction on entering information about your customer's contacts.

See also: Create a new presentation; utilities system online reference.

Account Button

Use this section of Customer Information to review the account information for your customer. You may want to enter a telephone and extension or fax number here.

See also: utilities system online reference.

Business Button

Use this section of Customer Information to review the SIC code, building function code and tax district related to your customer's business. The tax district listed for your customer is important. This information will tell the sales system which rates will be available in your presentation.

See also: utilities system online reference.

Facility Button

Use this section of Customer Information to enter the number of square feet, days per week the customer operates the facility, number of hours of operation and the number of employees who work in the facility. This information is for your use only and does not affect other areas of the system.

See also: utilities system online reference.

Address Button

Use this section of Customer Information to review the business and service address information for your customer. The mainframe file you have imported includes this information. You will want to change this information if the customer has moved operations or changed the location of their administrative offices. This dialog box gives you the opportunity to update the address information for your presentation and your records.

See also: utilities system online reference.

Contacts Button

Use this section of Customer Information to record or update several items: names, titles and phone number of people you contact regularly at your customer's place of business. The account information you imported contains this information, but utilities system allows you to make changes if your customer contacts change.

See also: utilities system online reference.

Recall a Presentation

If you have previously created a customer presentation, you will need to recall it from the hard drive when you make your sales call. When you recall an existing utilities system presentation, all areas of utilities system will again be available for selection and use. There are two ways to access your existing presentations. The first procedure is a simple retrieval with no additional options. The second has several functions integrated into the selection of an existing presentation.

Simple retrieval: 1) Choose File: Open; 2) Click to choose an appropriate file.

Retrieval with options: 1) Choose File: Find File; 2) You can click to choose an appropriate file and/or use the buttons across the bottom of the dialog box to customize your search functionality.

Open: This button allows you to open a selected presentation from the list of options displayed in the dialog box.

Filter: This button lets you narrow your search for a particular presentation or set of presentations. You can customize a search based on customer name(s), dates and salesperson name.

Sort: This button lets you sort all presentations by date, salesperson, customer, file name or presentation title.

Location: This button lets you select a drive and/or directory to search for presentations you have stored in areas other than the default drive and directory.

Delete: The delete button lets you delete a presentation from the list displayed in the dialog box. If you choose to delete a presentation, a message box will appear to confirm your intent to remove the selected presentation.

Copy: This button lets you copy a presentation to a selected directory and drive. This button will allow you to copy one presentation at a time.

Close: This button lets you close the Find Presentation dialog box and return to your original position in utilities system.

Tip: All previously saved presentations will be stored with your assigned file name followed by the .ew1 extension. If you do not choose to assign a file name to your presentation, a default file name will be used.

See also: Start your system; File Open; Find Presentation.

Manage Your Files

Utilities system lets you easily save and recall your customer presentations. These file management capabilities allow you to perform a variety of tasks which may include: saving a new presentation (File: Save As); replacing an older presentation with a modified version (File: Save); replacing an old file name with a new file name (File: Save As); copying or deleting presentations (File: Find File); sorting or filtering presentations (File: Find File).

All previously saved presentations will be stored with your assigned file name followed by the ew1 extension. If you do not choose to assign a file name to your presentation, a default file name will be used. The default file name is assembled by using the first eight letters of an account name. For instance, if the account name was Imperial Manufacturing, the default name would be imperial.ew1. If the first account name contains fewer than eight characters, utilities system looks for a second name and inserts an "_" between the names. For instance, ABC Data Corporation would be represented as ABC_Data.ew1. All previously saved presentations will be stored with your assigned file name followed by the .ew1 extension. You can change this extension. However, it is not recommended unless you require a customized style of file management.

See also: Save your presentation; Recall a presentation.

Set System Options

The Windows Control Panel provides you with a variety of options for changing the configuration of your system. These changes can only be made while you are using Windows. When you make a change using the Control Panel, the change will be evident the next time you use Windows. The changes that you make using the Control Panel will be evident in all aspects of your system including utilities system. If you do not know how to adjust the control panel options, consult your Windows Manual.

See also: Start your system; Customize utilities system.

Error Messages

Error messages are displayed to help ensure that utilities system maintains its full functionality. If an error message is displayed while you are using utilities system, it could be indicating the need for data or be confirming your intent to remove data. Error messages are usually very specific and displayed in conversational terms. Error messages are generally displayed at the time of, or shortly after an error occurs. When you have closed or responded to the error message box, you will be re-positioned at the error location, where you can cancel or retype an incorrect entry.

Typical error messages may include:

No Scenario Included in Proposal: This message means you need to create a scenario in the service rates dialog box.

Delete account "ABC?": This message confirms your intent to delete data. If you do not want to delete that information, click to cancel the command.

Must enter both account number and account name: This message and others like it indicate the need for more data.

Invalid Entry. The range is X to X: This message indicates that the data you have entered does not fall between the parameters assigned for that value. You must re-enter data so that it falls between the values given in the error message.

Start Your System

To access all areas of utilities system, you will begin a new presentation with mainframe data, open an existing presentation, or begin a new presentation without mainframe data. All areas of utilities system are available for selection and use after a presentation has been selected.

Start a presentation with mainframe data: 1) Choose File: New; 2) Click on mainframe File and choose the appropriate file; 3) Click on Sort to arrange the displayed files; 4) Highlight an account name and click on Add or Add All to import the account information.

Start a new presentation without mainframe data: 1) Choose File: New; 2) Click OK to bypass Import Accounts; 3) Click New under Accounts to enter an Account Number and Account Name; 4) Click New under Meters to enter a Meter Number.

Recall an existing presentation: 1) Choose File: Open; 2) Click to choose the appropriate file.

See also: Prepare mainframe information for use in your presentation; Create a new presentation.

Make Menu Selections

Utilities system commands are listed on menus. All menus are listed on the menu bar along the top edge of the application window. When you select a menu item and choose a command, that command will carry out a specific action. Move the pointer to your desired menu item and click once. This will open the menu. Click on a command to activate it or click outside of the menu to close it. If you are not using a mouse, you can access the menu selections by pressing Alt or F10 to highlight the menu bar. Press the left or right arrow to select a menu, and press Enter to open the menu. Use your arrow keys to select a command, and press Enter to execute that command.

Utilities system uses abbreviated key combinations for menu bar and command selections. If a name in the menu bar or command list has an underlined letter, you can press Alt and then type the letter that's underlined to open the menu or execute the command.

See also: Start your system; Manage your files.

Work with Dialog Boxes

The dialog box is a standard item used to display messages on the screen. Utilities system displays a dialog box to request information about a specific task or to supply you with information you might need. Most dialog boxes contain options you can select. Choosing an option may require that you click on a button. Clicking a button will designate, confirm or cancel an action. You may choose to move a dialog box using your mouse or a combination of keyboard commands. If you want to move within a dialog box you can use your mouse to point and click on the option or area you want to move to. You can also use the Tab key to move between option selections.

If you want to close a dialog box without completing a command: choose the Cancel button, or press Esc, or double-click the Control-menu box.

See also: utilities system definitions.

Customize Utilities System

Whether you have just installed utilities system or would simply like to change the look and feel of the screen and the displayed information, several options are available to customize utilities system to your specifications. They include: Interface Options and Office Information.

Interface Options: Choose Options: Interface and a pop window appears which allows you to turn the toolbar and the status bar on and off. The box containing an "x" is the option that is currently selected. Click your pointer at the right of the selection box to list the options. The Interface Options window also contains an option that allows you to choose a screen background or wallpaper pattern. Choices are available in a drop-down list box. Click your pointer at the right of the selection box to list the options.

Office Information: Choose Options: Office Information and a pop window appears which will let you input general office information about the salesperson currently using utilities system. If you click your pointer to the right of the salesperson selection box, you will display a current list of salespeople. You may click the Edit button to the right of the drop-down list to edit, delete or add a name to the list of salespeople. You can add or edit the remaining office information in the text boxes.

See also: Manage your files; Set system options.

Create Cover Letter Templates

Utilities system gives you a standard cover letter template. You can use this template or create cover letter templates in Microsoft Word. You can create an unlimited quantity of templates which will contain only the cover letter body text. Utilities system will create your salutation, your closing, and date your correspondence. The cover letter templates will be stored in a directory which will be accessed by choosing Options: Report Setup. A dialog box will appear which will let you select the most appropriate letter from the list of templates you have created.

See also: Set system options.

Get Help From This System

There are two basic types of help available in utilities system: Context-sensitive help and Reference or topic-oriented help.

Context-sensitive help: This type of information may be accessed by clicking an area on the screen by pressing the F1 key in a dialog box or pop window. This will take you to a specific piece of information. The computer keeps track of where the user is, and when prompted, displays the help information specifically related to that context. This information can come in the form of an online reference, procedure description, or both.

Reference or topic-oriented help: This type of information may be accessed by pressing Alt + H or selecting Help from the menu bar. This displays a list of topics you can choose to access specific details about utilities system. You decide what type of information is most useful and the computer retrieves the information for your use. Select topics from the table of contents by clicking on the topic. You may also use the Search button, which will allow you to search all help areas for a specific piece of information. The Back button allows you to go back to the previous screen you viewed. The Contents button will always take you back to the original list of topics or your table of contents. The History button will display a list of the 50 most recently displayed topics so that you can quickly access a topic without having to backtrack one step at a time.

Tips: Keep the Help Viewer open and press Alt + Tab to toggle between a help topic and utilities system. This will allow you to keep your place in the help file if you want to view a help procedure and maintain program functionality.

See also: Error messages.

Review and Select Graphic Slides to View with Your Customer

Utilities system's Graphic Overview slides use pictures and text to highlight key features and benefits. They also explain complex concepts. Using this module, you can show graphic slides to your customer, or print selected graphics in your proposal. You may build a slide show before visiting your customer, or manually select graphics while visiting your customer. The Graphic Overview module is also a good source of training material for new representatives, and is an excellent way to learn about new utility company programs as they are released.

Use the home base Overview button to access the Graphic Overview module. Within the Graphic Overview module, you can: Use the Browse button or icon to select a carousel and/or specific slides for viewing. Use the Next and Previous buttons to advance slides one at a time. Use the Display button to change the way you show graphic slides. Use the Slide Show button to create or revise a slide show. Use Capture in the control-menu box to make graphic slides available for slide shows or your printed proposal. Slides that are captured for the Proposal carousel may be printed in the Proposal module.

Within the Proposal module, you will be able to print the complete set of captured graphics. The Graphic Overview file folder with a plus (+) sign contains a group of available graphics. Double-click on the folder to list the folder's contents. Proposal elements will be printed in the indicated order. You must print all or none of the selected graphics.

See also: Print your proposal; Save your presentation; Present your recommendations.

Include Reports in Your Proposal

Utilities system lets you easily create proposals for your customer. By including appropriate reports with supporting graphics and additional information, you may more easily convince your customer of your recommendation's value. When you prepared your presentation, you selected scenarios you wanted to recommend in your proposal. The appropriate reports for those recommendations—and other suggested documentation—are available for printing in the Proposal module. Move to the Proposal module to select reports and other materials for your printed proposal. A file folder with a plus (+) sign contains a group of available reports. Double-click on the folder to list the individual reports. Add appropriate reports and supporting materials to your proposal. Remove material you want to delete from your proposal. Preview your proposal to confirm that it meets your needs. Print your proposal for your customer. The Proposal dialog box shows the reports' printing order.

See also: Support your recommendation with overview graphics; Support your recommendation with additional information; Save your presentation; Present your recommendations.

Support Your Recommendation with Graphic Overview

Utilities system's colorful graphics provide information about utility companies, its service rates and its programs. Use the graphic slides with additional information sheets to explain features, benefits and concepts related to your recommendations. You can build a slide show before visiting your customer, or manually select graphics while visiting your customer. Show slides on the screen, and/or print selected graphics as part of your proposal to maximize your effectiveness. Use the home base Overview button to access the Graphic Overview module.

Within the Graphic Overview module, you can: Use the Browse button or icon to select a carousel and/or specific slides for viewing. Use the Next and Previous buttons to advance slides one at a time. Use the Display button to customize the display method. Use the Slide Show button to create or revise a slide show. Use Capture in the control-menu box to make graphic slides available for slide shows or your printed proposal. Slides that are captured to the Proposal carousel may be printed in the proposal module.

Within the Proposal module, you will be able to print the complete set of captured graphics. A file folder with a plus (+) sign contains a group of available graphics. Double-click on the folder to list the folder's contents. Proposal elements will be printed in the indicated order. You must print all or none of the selected graphics.

See also: Print your proposal; Support your recommendation with additional information; Save your presentation; Present your recommendations; Propose utility company services.

Capture Graphic Slides

To include a Graphic Overview slide in a slide show or your printed proposal, you must first capture the desired graphic slide while you are viewing the slide. Choose Capture in the control-menu box. Then, choose or create the name of the slide show that will receive the captured slide. Place the graphic in the Proposal slide show to make it available for printing in the proposal.

See also: Support your recommendation with overview graphics; Save your presentation.

Use Slide Show

Utilities system contains quality graphics that will help orient your customer, explain complex concepts, and increase your customer's understanding of your proposal. Within the Graphic Overview module, use the Browse button to find graphic slides that you plan to include in your slide show. Capture these slides by clicking on the Graphic Overview control-menu box. Name the slide show that should receive the captured slides. If you have previously named the show, you may select it from a list. Continue capturing slides to build your show slide by slide.

To play a new or revised slide show, use the Browse button to select the slide show from listed carousels. View the slide show as you would view other graphics. To maintain your slide show, use the Slide Show button. The Slide Show dialog box includes two areas. The top area lists slide shows and should now include your new slide show's name. The bottom area lists individual graphic slides within the selected slide show. Use the Add button to start building a new slide show. Use the upper Rename button to give a new name to an existing slide show. Use the upper Delete button to erase an entire slide show. Use the Copy button to duplicate an entire slide show. Click on the slide show you want to copy. Click Copy. Type in a new slide show name. Use the Preview button to view an individual slide. Use the lower Delete button to remove undesired slides from a carousel. To review a slide show's contents, select its name in the upper box, then observe the slide names and their order in the lower box.

See also: Support your recommendation with overview graphics; Support your recommendation with additional information; Save your presentation; Print your proposal.

Browse

Use the Graphic Overview module's Browse dialog box to view a slide carousel, or to view an individual graphic slide. Access the Browse dialog box with the Browse button or Browse icon. To view the graphics as a set, choose the desired carousel. Choose a specific graphic only if you do not want to start at the carousel's first graphic. To view a specific graphic, choose the desired carousel and graphic. To preview a graphic, highlight its name. A small picture of the graphic will appear in the Browse dialog box. This may be useful if you know a particular slide's appearance but do not know its title. Preview graphic from Graphic Overview See also: Support your recommendation with overview graphics; Display; Browse.

Display

Use the Display button or Display icon to control the graphic display. Select Manual to move forward slide by slide through the graphics using the Next button. Use the Previous button to move backward through the graphics. Use Browse to view another carousel or to select an individual slide. Select Automatic to have a specific carousel advance at the speed you designate. You may click the Pause button or Pause icon to temporarily stop the slide display, but you may not move backward through the display. You would again click Pause to continue viewing slides. Adjust the speed to meet your needs. To stop an automatic slide show, click Display, change back to manual, then click OK. Select a Windows Mode or Full Screen display mode. Windows Mode is the display that includes buttons at the top. If you choose Full Screen, the dialog box's top buttons will disappear to give you and your customer a broader view of the graphic slide. Use the icons at the bottom of the screen to choose a different carousel, change the screen display, or move forward and backward. If you are in the Full Screen display mode and your slide show is running on automatic, you must return to the Windows Mode display to stop the slide show. You must also be in the Windows Mode to exit the Graphics Overview module.

See also: Support your recommendation with overview graphics; Include reports in your proposal.

Support Your Recommendation with Additional Information

The supporting information you include in your presentation and in your printed proposal will play a key role in persuading your customer to take a recommended action. It will increase your credibility and your customer's understanding. Utilities system contains information sheets that you may show on the screen and/or include in your printed proposal. Use them to explain general concepts, or to answer customer questions about specific utility company service rates and programs. Before you meet with your customer, you can use the information sheets to remind you of a specific service rate or program's benefits and eligibility requirements.

For instance, when you recommend a Peak Control service rate for your customer, you can develop a presentation that includes a related sell sheet, a listing of past control periods, and—if you desire—a rate sheet. The sell sheet helps you explain how the customer will benefit from your recommendation. The control period history will help answer the question "How often will a utility company call for an interrupt period?" The rate sheet provides reference material on the highlighted service rate's eligibility requirements. View these information sheets within a module by highlighting a scenario and clicking the Information button. Use the Proposal module to include information sheets in your printed proposal, or choose Print Topic from the File menu while viewing a desired information sheet.

See also: Save your presentation; Print your proposal; Present your recommendations; Propose utility company services.

Save Your Presentation

You invest your valuable time in developing a proposal. Preserve your work by frequently saving it. You can then recall your presentation to review it with your customer, or to modify it to comply with customer requests. Frequent saves also help ensure that your work is not lost if your computer experiences an interruption.

Utilities system lets you easily save your customer presentations. To save a new presentation, or to replace the originally saved presentation with your modified version, simply return to the home base dialog box and choose File: Save. Ensure that the file name, directory and drive are correct. To save an existing presentation under another presentation name, choose File: Save As. Then rename the presentation. If needed, change the directory and/or drive where the presentation will be stored.

See also: Manage your files; Print your proposal; Recall a presentation.

Print Your Proposal

In preparing your presentation, you made reports, graphic slides and information sheets available for printing in the Proposal module. Your proposal will be more complete and convincing if you use these materials to support your recommendations. A Proposal module file folder with a plus (+) sign contains a group of available reports, information sheets or graphic slides. Double-click on the folder to list the folder's contents. Select each item you want in your proposal and use the Add button to build your proposal. You must select all or none of the available Graphic Overview slides. Use the Remove button to delete an item from your proposal. Preview your proposal to confirm that it meets your needs, then Print the personalized proposal for your customer. The proposal elements will be printed in the order shown in the Selected Reports box.

See also: Save your presentation; Present your recommendations.

Present Your Recommendations

Utilities system gives you freedom to present your recommendations so they produce the best results for you. Start by recalling a presentation. You may introduce your presentation by using Graphic Overview to show a slide show or a specific graphic slide related to your planned discussion. You may also use overview graphics later in your presentation to explain specific concepts.

You may use utilities system to present your recommendation, show how you developed it, discuss alternatives, and revise your recommendation. You may have your customer view this on the screen, or you may provide printed reports. Use program information related to specific service rates or programs to support your recommendation. Use a module's Information button to access this information for viewing. While you are with your customer, you may also wish to suggest utility company services. Access these programs using the home base Services button. You may show this information on the screen or give your customer printed information sheets.

You may revise your recommendation based on additional customer information. You may also print a complete proposal that may be used by various people in your customer's organization. A complete proposal allows your contact to carry the complete message to the decision maker. Make sure to save your final presentation and to manage your files so you can find the correct presentation file when you need it.

See also: Support your recommendation with additional information; Propose utility company services.

Print Information Sheets Supporting Your Recommendation

Access supporting information sheets within a module by highlighting a scenario and clicking the Information button. Use the Proposal module to include information sheets in your printed proposal, or choose Print Topic from the File menu while viewing a desired information sheet.

If you use the Proposal module, appropriate information sheets will be available in a module's folder. A file folder with a plus (+) sign contains a group of available proposal elements. Double-click on the folder to list the folder's contents. Select each item you want in your proposal and use the Add button to build your proposal. Use the Remove button to delete an item from your proposal. Preview your proposal to confirm that it meets your needs, then Print the personalized proposal for your customer. The proposal elements will be printed in the order shown at the right of the Proposal dialog box.

See also: Present your recommendations.

Present Selected Overview Graphics

Your presentation will be more convincing if you use utilities system's graphic slides to help tell your customer about utility companies, its service rates and its programs. The colorful graphics accompanied by text make it easier for your customer to understand complex ideas. If you have not built a Graphic Overview slide show before visiting your customer, you can manually select graphics while visiting your customer. Show slides on the screen, and/or print selected graphics as part of your proposal.

Use the home base Overview button to access the Graphic Overview module. Within the Graphic Overview module, you can: Use the Browse button or icon to select a carousel and/or specific slides for viewing. Use the Next and Previous buttons to advance slides one at a time. Use the Display button to customize the display method. Use the Slide Show button to create or revise a slide show. Use Capture in the control-menu box to make graphic slides available for slide shows or your printed proposal.

Within the Proposal module, you will be able to print the complete set of captured graphics. The Graphic Overview file folder with a plus (+) sign contains a groups of available graphics. Double-click on the folder to list the folder's contents. Proposal elements will be printed in the indicated order. You must print all or none of the selected graphics.

See also: Review and select graphic slides to view with your customer; Support your recommendation with overview graphics; Print your proposal; Save your presentation.

Compare Service Rate Alternatives (submenu)

Use information to answer customer questions: Compare service rates; Propose time of day rates; Propose alternative use patterns; Investigate service rates for new facilities.

Record Inventory of Existing Equipment

The utilities system Inventory module helps you evaluate your customer's existing energy consumption. Before you can select the Inventory module, you must create a new customer file or open an existing file. Click on the home base Inventory icon to access the Inventory module. The Inventory module is made up of a worksheet where you can enter, save, or make changes to your customer's equipment inventory.

Within the Inventory Worksheet: Select an equipment type from the list. Equipment types include Chiller, Cool Storage, Glazing, Humidification, Lighting, Motor, Refrigeration and Rooftop. Enter and save your customer's equipment inventory information. Recall stored customer inventory information and make changes to create conservation scenarios. Close the Inventory Worksheet to return to the home base. Once you have recorded the customer's inventory, use the Conservation module to make recommendations for equipment changes.

See also: Use the Inventory Worksheet; Save your presentation; Create a new presentation.

Use the Inventory Worksheet

Use the home base Inventory icon to access the Inventory Module. Double-click to select the equipment type you are recording, or highlight the equipment category and click the Edit button. The Inventory Worksheet for that equipment type is then displayed. For example, if you selected Lighting, the title bar will say Lighting Inventory.

Within the Inventory dialog box: Select the Area/Type where the equipment resides, or add a new Area/Type. Use the New button to access the existing equipment dialog box. Use the Edit, Delete and Copy buttons to modify highlighted inventory entries. These buttons are activated only when you have existing inventory information. Edit existing inventory information by highlighting the entry you want to revise and clicking Edit. The existing inventory for the highlighted entry is displayed.

You can change the information fields. Click OK to save your changes. Delete existing inventory information by highlighting the entry you want to eliminate, and clicking Delete. The warning dialog box is displayed. If you change your mind, or want to review the information, click Cancel. Click OK to confirm the deletion. Copy existing inventory information by highlighting the entry you want to duplicate, and clicking Copy. The Area/Type Copy dialog box is displayed. If you have similar inventory entries, use the Copy button to copy this information and then edit the information. You can also copy inventory information to other Area/Types. In the From field, your previous Area/Type is shown. In the To field, you can select one of the default selections or type a new Area/Type. Click OK to save your changes. Use the Cancel button to return to the previous dialog box.

Area/Type

Utilities system's Inventory and Conservation Area/Type input boxes have four default settings: Office, Lobby, Production and Warehouse. You can select one of these settings or type a new Area/Type in the field.

Use Existing Lighting Inventory Dialog Box

When you select New or Edit in the Lighting Inventory dialog box, the Existing Lighting dialog box is displayed. Within the Existing Lighting dialog box: Use the Attachment button to customize the attachments for each lamp. Within the Attachment dialog box, you can specify and save applicable information. Using the attachment, when applicable, will allow you to create a more detailed lighting inventory for your customer. Use the Add button to enter a custom lamp not included in the default list. When you select Add, you can choose the lighting type, lamp, watts/units, lamps/unit, and ballasts. Select OK to save your new lamp entry in the Existing Lighting dialog box. Use the Edit button to access the Custom Lamp dialog box. You can only edit highlighted lighting information that you added as a custom lamp. The default lighting information cannot be changed. The Oper Hrs button will access the Operation Hours dialog box. By entering the Hours/Day, Days/Week, Percent of On Peak, and the Percent of Coincidence Factor, the annual operating hours of the lighting equipment will be recalculated. Click OK to save changes or additions. Use the Cancel button to return to the Lighting Inventory dialog box without saving changes.

Use Existing Motors Inventory Dialog Box

When you select New or Edit in the Motors Inventory dialog box, the Existing Motors dialog box is displayed. The selection box contains a complete list of all motors defined within Motor Master. Within the existing equipment dialog box: Use the top input boxes to record the motor's horsepower, RPM, enclosure type and voltage. Motors with these attributes will be available in the center of the dialog box. Select the appropriate motor, and indicate the number of units in place. Use the Add Motor button to customize the motor inventory. When you select Add, you can enter the manufacturer, type, RPMs, model, voltage, efficiency and horsepower. Select OK to record your entry. The new motor will be recorded in the existing motor dialog box.

Use the Edit Motor button to access the Custom Motor dialog box. You can only edit highlighted motor information that you added as a custom motor. The default custom motor information cannot be changed. The Oper Hrs button will access the operations dialog box. By entering the Hours/Day, Day/Week, Percent of On Peak, and the Percent of Coincidence Factor, the annual operating hours of the motor inventory equipment will be recalculated. Click OK to save additions or changes. Use the Cancel button to return to the Motor Inventory dialog box without saving changes.

See also: Operation Hours—Lighting and Motors; Use the Inventory Worksheet; Record inventory of existing equipment.

Operation Hours—Lighting and Motors

Use of lighting and motor equipment varies. Therefore, utilities system allows you to designate the hours, days per week, percent of on peak (kWh), and percent coincidence factor for your customer's equipment. Utilities system calculates the annual hours automatically when you select OK.

Prepare Walk-Through Audit Reports

Utilities system allows you to enter all the information needed to complete a Walk-Through Audit. After you have used the Inventory module to enter your customer's present (end-use) inventory, you can print and package the following reports together as a Walk-Through Audit.

Cover Letter—customized cover letter can be selected for printing with the Walk-Through Audit report. To do this, select Options from the Home Base screen. Select Report Setup. Change the Cover Letter Directory and Filename to c:\cwc-dir\ew\walkaudt.doc.

Customer Profile Report—contains information about your customer and your customer's past twelve months' consumption history.

Inventory Report—provides your customer with a listing of the customer's present inventory.

Sell Sheets—summarizes energy-saving programs that you are recommending for your customer to consider.

Rate Sheets—Common Questions/Answered—provides information to help your customer understand service rates.

Rate-Tariff Sheets—Provide your customer with the actual tariff for service rates.

See also: Record inventory of existing equipment.

Recommend Conservation Programs

Utilities system's Conservation module will help you propose energy-efficient programs for your customer. Use the home base Conserve button to access the Conservation module. Before you replace or retrofit existing equipment, use the Inventory module to record existing equipment.

Use the Conservation module to: Plan energy-efficient options for a new structure. Replace or retrofit an existing structure's inefficient electrical equipment. Investigate savings and rebates that your customer could gain through conservation programs. The Conservation module has been designed to adapt to various selling styles and situations. Each line in the Conservation Worksheet is a scenario containing improvements you want to compare or suggest as a group.

See also: Propose equipment for a new or existing structure; Use Conservation Worksheet; Calculate finance payments.

Propose Equipment for a New or Existing Structure

To replace or retrofit a facility's electrical equipment, you must first complete an inventory of your customer's existing equipment. Do this in the Inventory module. Then, access the Conservation module using the home base Conserve button. Within the Conservation Worksheet, click New to obtain a list of conservation programs. Select the program you want to consider. A dialog box will ask you about the proposed equipment and will show existing equipment at the bottom of the window. Complete the appropriate information.

Use the Description input box to name your scenario, then select the Area/Type for the existing equipment to be replaced. Use the Replace button as a toggle to change existing equipment's replacement status in the bottom box's Repl column. Equipment you originally entered in the Inventory module will be set for replacement when you enter the Conservation module. If you input additional existing equipment after you start using the Conservation module, the items will not automatically be replaced. Retrofit equipment by highlighting the equipment to be modified, and click the Retrofit button. Use New to select equipment for your proposed scenario. Complete the requested information. Use the Edit, Delete and Copy buttons to modify the highlighted proposed conservation program scenario. Use Add to create a custom entry for an adjacent option list if the equipment you want is not included in that list. Use Edit to modify your custom entry.

Return to the dialog box that shows the proposed and existing equipment. To explore your customer's financing options, access the Energy Financing module after you have "included" scenarios in your presentation. If during a presentation your customer suggests a slightly different configuration, copy your scenario and edit it to the customer's specifications. Then, you can compare both results to determine the best option.

See also: Support your recommendation with additional information; Print your proposal; Save your presentation; Present your recommendations.

Use Conservation Worksheet

The Conservation Worksheet helps you propose energy-efficient programs for your customer. Access it by using the home base Conserve button. Use the New button to select the conservation program you want to consider. Enter the information requested by the dialog box that appears. Use the Edit, Delete and Copy buttons to modify the highlighted proposed conservation program scenario. Highlight a scenario and review its rebates, savings, payback, and summary information. Use the Include button or double-click on the scenario if you want to include the scenario in the Proposal module, the home base information, the Conservation Worksheet's bottom summary information, and the Energy Financing module. Click Include again to unmark an included scenario. Use the Options button to complete information needed for various reports and rebate forms. Use the Information button to view sell sheets related to the highlighted conservation program. Use the Close button to return to utilities system's home base.

See also: Propose equipment for a new or existing structure; Calculate finance payments; Print your proposal; Save your presentation; Present your recommendations.

Summary Information

The summary located at the bottom of the Conservation Worksheet includes projected annual savings, estimated costs, and return on investment. The summary information may consist of text or a pie chart. Select the Savings radio button to view a pie chart. Select the Summary radio button to view summary information in text form.

Use the Current Rate radio button to base the summary calculations on your customer's current service rate. Use the Proposed Rate radio button to base the summary calculations on the proposed service rate you "included" in the Service Rates module. Use the Individual radio button to display a summary of the highlighted scenario. Use the Total radio button to summarize information from all the scenarios you marked using the Include button.

Account Summary

The utilities system home base window summarizes recommendations you make in the Service Rates, Conservation and Energy Financing modules. This includes multiple accounts and multiple meters. Use the Service Rates, Conservation Programs and Energy Financing buttons to view a specific module's summary.

Selecting the Right Lighting Rebate

Two rebates are available in utilities system:

Full Conversion Rebate and Partial Rebate. To access the rebates, use the Rebate button in the Lighting Efficiency dialog box. Utilities system automatically calculates the rebates based on the customer inventory information and the scenarios you have proposed. The default setting is for Full Conversion Rebate. Select the best rebate for your customer by clicking on it.

See also: Propose equipment for a new or existing structure; Use Conservation Worksheet.

Adjustable Speed Drive

Adjustable speed drives (ASDs) can improve the operating efficiency of your customer's motor(s). Before attaching an adjustable speed drive within the Conservation module, you must input your customer's existing motor(s) in the Inventory module.

Within the Conservation module's worksheet: Click New and select ASD Rebate to access the Adjustable Speed Drive dialog box. Existing motors will appear in the bottom input box. Highlight the motor to which you want to attach an ASD. Click Attach ASD to access the Proposed ASD dialog box. Input the appropriate ASD information, then access the Operations Flow dialog box by using the Oper Flow button. The Flow At Operating Point column will show loads at which the motor can be operated. Type the percent of time the motor will operate at each operating point. utilities system will adjust the 100% entry so that your total will always equal 100 percent. Type the Days/Year Operated for later reference. After you click OK or click in the Days/Year Operated input box, utilities system calculates a total point value. In the Operations Flow dialog box, view the Total Point Value. Compare this value with the bottom table to determine the ASD's potential for economic feasibility.

See also: Propose equipment for a new or existing structure; Use Conservation Worksheet.

Operation Hours for Existing Rooftop Air Conditioning

Because rooftop air conditioning use varies by season, utilities system allows you to designate operation hours for each month. You can input existing equipment's operation hours in the Inventory module and proposed equipment's operation hours in the Conservation module.

While describing the equipment, use the Oper Hrs button to access the Operation Hours dialog box. You can use the Set Default button to obtain a utility company's default data for kW and hours, or you can type information in the input boxes. If you want to revert to the default data after you have typed information, use the Set Default button. All of the information you typed in the Operation Hours dialog box will be replaced with the default information. Utilities system will automatically calculate the annual operation hours.

See also: Propose equipment for a new or existing structure; Use Conservation Worksheet.

Operation Hours for Proposed Rooftop Air Conditioning

Because rooftop air conditioning use varies by season, utilities system allows you to designate operation hours for each month. You can input existing equipment's operation hours in the Inventory module and proposed equipment's operation hours in the Conservation module.

While describing the equipment, use the Oper Hrs button to access the Operation Hours dialog box. You can use the Set Default button to obtain a utility company's default data for kW and hours, or you can type information in the input boxes. If you want to revert to the default data after you have typed information, use the Set Default button. All of the information you typed in the Operation Hours dialog box will be replaced with the default information. Utilities system will automatically calculate the annual operation hours.

See also: Propose equipment for a new or existing structure; Use Conservation Worksheet.

Select Conservation Program

Use this dialog box to select the desired conservation program. Highlight the desired program and click OK, or double-click on the desired program.

Proposed ASD

Input the appropriate ASD information, then access the Operations Flow dialog box by using the Oper Flow button.

Operations Flow

Use this dialog box to show how your customer's motor will be used. Utilities system will use the data you input to calculate the adjustable speed drive's potential to save your customer money.

The Flow At Operating Point column shows loads at which the motor can be operated. Type the percent of time the motor will operate at each operating point. Utilities system will adjust the 100% entry so that your total will always equal 100 percent. Type the Days/Year Operated for later reference. After you click OK or click in the Days/Year Operated input box, utilities system calculates a total point value. In the Operations Flow Dialog box, view the Total Point Value. Compare this value with the bottom table to determine the ASD's potential for economic feasibility.

See also: Propose equipment for a new or existing structure; Use Conservation Worksheet.

Operation Hours

Use this dialog box to designate how much your customer's rooftop air conditioning operates each month. You can use the Set Default button to obtain a utility company's default data for kW and hours, or you can type information in the input boxes. If you want to revert to the default data after you have typed information, use the Set Default button. All of the information you typed in the Operation Hours dialog box will be replaced with the default information. Utilities system will automatically calculate the annual operation hours.

See also: Operation hours for existing rooftop air conditioning; Operation hours for proposed rooftop air conditioning.

Lighting Efficiency

Utilities system automatically calculates Lighting Efficiency Rebates based on your previous work. Within the Lighting Efficiency dialog box, select the rebate that is best for your customer.

Propose Utility Company Services

While you visit your customer, you may also recommend utility company services. Utilities system contains feature, benefit and eligibility information on energy audits, customer service programs, and other areas to help you recommend these programs. Access this information by using the home base Services button. You may show these information sheets on screen and/or include them in your printed proposal. Use them to explain general concepts and to answer customer questions. Before you meet with your customer, you can use information sheets to remind yourself of available services and their details. Use the Proposal module to include these information sheets in your printed proposal, or choose Print Topic from the File menu while viewing a desired information sheet.

See also: Support your recommendation with additional information; Support your recommendation with overview graphics; Save your presentation; Print your proposal; Present your proposal.

Print Information for Utility Company Services

To print information on services, first use the home base Services button to access that information. Use the Proposal module to include information sheets in your printed proposal, or choose Print Topic from the File menu while viewing a desired information sheet. If you use the Proposal module, this type of information sheet will be available in the Informational Programs folder. A file folder with a plus (+) sign contains a group of available proposal elements. Double-click on the folder to list the folder's contents.

Select each item you want in your proposal and use the Add button to build your proposal. Use the Remove button to delete an item from your proposal. Preview your proposal to confirm that it meets your needs, then Print the personalized proposal for your customer. The proposal elements will be printed in the order shown at the right of the Proposal dialog box.

Developing a Proposal for Multiple Accounts/Meters

Utilities system gives you the flexibility to develop one proposal for a customer who has multiple accounts and/or meters. Most of your steps will be similar to those you would perform for a single-account or single-meter customer. Begin by selecting accounts/meters for your presentation. Select File: New, then use the Import Accounts dialog box to make your customer's account information available while you create your proposal. After you click OK, an Accounts/Meters dialog box will appear. Select the first account and meter you want to use. You can only work with one account and meter at a time.

Now, use the Customer Information module to designate the name you want printed on your reports. Use the Name button to access the dialog box where you will enter this information. You will probably want to revise the name and address information so that it encompasses all of the proposal's accounts. Once you have entered this information, you will not have to enter it again for a new meter or account within that proposal. Prepare your proposal one account at a time. Select File: Accounts/Meters and start with the first account. Prepare a complete proposal meter by meter, but do not print your proposal at this point. Repeat this process until you have prepared proposal components for each account.

Notice that worksheets only summarize scenarios for the active account/meter. A summary of the proposal's accounts/meters is shown at the home base window. Use the home base Service Rates, Conservation Programs and Energy Financing buttons to view the individual scenarios that comprise your proposal. After you complete your proposal, use the Proposal module to obtain your printed document. You may select one cover letter and various reports. Utilities system will print all the reports of one type before continuing to the next report type. For example, it would print Service Rates Summary reports for all accounts, then print Service Rates Detail reports for all accounts.

See also: Create a new presentation; Compare service rate alternatives; Record inventory of existing equipment; Propose equipment for a new or existing structure; Calculate finance payments.

Calculate Finance Payments

The Energy Financing module will help you determine finance options for your customer. Use the home base Finance button to access the Energy Financing module. If you have not yet proposed conservation programs, you must do so before you investigate finance options. If you have proposed conservation programs (and marked them for inclusion in your presentation), they will be listed in the Energy Financing module.

The Energy Financing module allows you to:

1) Review a summary of the conservation programs (appears on the top half of the screen) and Include them in the finance calculation. Click a conservation program to highlight it and then click Include or double-click on the scenario to add the scenario to the finance calculations. Press Include again to omit the conservation program.

2) View finance information (appears on the bottom half of the screen). The system will update the finance information as you Include or omit conservation programs.

3) Use the Terms button to change the amount to finance, APR or number of months to finance. For example, the customer may want to pay a portion of the cost up front, reducing the amount to finance. Click Override to enter the new amount to be financed. The customer may also want to change the term. Click Term to change from Calculate Term to a user-entered term.

4) View the estimated effect the proposed financing will have on the customer's monthly bill (appears on the lower right part of the screen).

5) Use the Information button to see sales information regarding Energy Financing. The Finance Summary report and finance forms will be available for printing from the Proposal module.

See also: Print your proposal; Support your recommendation with additional information.

Calculate Term

Utilities system automatically calculates a finance term up to 60 months. The system finds the term that will yield a monthly payment with the smallest impact to the customer's monthly energy bill. To change the term, click the Terms button, then click on the Term (months) radio button and enter the desired length of financing.

Prepare Mainframe Information for Use in Your Presentation

Utilities system is designed to work with data available through a link to the mainframe system. When you use mainframe to download information on customers, you can access up-to-date, accurate information without going through the time-consuming process of entering it by hand. This information includes current account information for your customer, including an accurate, 12-month history of your customer's electric consumption. The mainframe information can save you a great deal of time over typing it into a database. See the mainframe documentation for assistance in downloading mainframe files.

Review Your Customer's Current Situation

Before you make a formal presentation or create a proposal, you will want to analyze the customer's current information within the Rate module's worksheet. The first line of the worksheet is reserved for the customer's current service rate. Highlight the first line and select Edit. Select the Rate Info . . . or Consumption buttons to display more detailed information on the rate or the customer's consumption history. The graph at the bottom of the screen displays Energy, Demand, Load Factor or Savings patterns. Select the radio buttons below the graph to change the information displayed by the graph.

See also: Compare service rates.

Use Information to Answer Customer Questions

The information sheets found in the Rates module contain reference material you can use to answer customer questions. The information contains items like Rate-Tariff sheets, sell sheets, and answers to common questions. The information sheets available in the Rates module can be used to explain the rate the customer is billed under or the one you are proposing. Utilities system will display the appropriate topics for the service rate you currently have in focus. To review and print the information sheets, click the Information button within the Rates module. Select the topic you want to review. You can review the information on the screen by clicking on Display Topic. To print, click on File: Print Topic You may also select information in the Proposal module and include it in the printed proposal you give to your customer. The service rate you have in focus determines the information that is available. Utilities system displays only the appropriate information topics that pertain to the service rate you are reviewing.

See also: Support your recommendation with additional information.

Compare Service Rates

The Rates module of utilities system is designed to be a flexible tool allowing the sales representative to help a customer visualize the service rate options available to them. Use the utilities system Rates module to: 1) Analyze the customer's current rate, consumption data, power and load factors, as well as taxes and fees currently applied to their account. 2) Compare service rate alternatives. 3) Analyze the impact of changing consumption. 4) Analyze the impact of changing PDL levels, service voltage, power factor correction.

You can offer customers several service rate options that can save them money on their electric bills. You can illustrate the advantages of each rate by creating different scenarios. Use these scenarios to compare the customer's present rate with other rates that fit your customer's needs. You can investigate a new service rate in the Rates module by clicking the New button and changing the displayed rate options to fit the customer's application. If your customer's use pattern will also change, click the Consumption button from the rate option window, and enter the new consumption data or change the present consumption data.

Printing the graphs for a scenario you have created. When you are reviewing a rate scenario for a client, click the Include button or double-click on the scenario to mark the scenario for inclusion in Proposal module reports. The graph that is displayed when you select Include will be included in the Service Rates: Summary and Detail reports located in the Proposal module.

See also: Propose alternative use patterns; Print your proposal.

Propose Time of Day Rates

Review the customer's consumption history. If you and your customer find ways to shift more of the customer's electrical load from daytime hours to nighttime hours, it may be a benefit to move the customer to a time-of-day rate.

Use either method below to propose alternative use patterns:

1) Select New from the Rates module worksheet. Then select a time-of-day rate and enter the consumption data that reflects the customer's changes.

2) utilities system can assist you by splitting the consumption data as a percentage of on-peak energy. Enter the split percentage in the % On Energy field.

3) Select Consumption to review and/or modify the resulting data.

4) Off-peak demand in excess of on-peak demand may be entered manually if it applies to your situation.

See also: Present your recommendations; Print your proposal.

Propose Alternative Use Patterns

Use utilities system to calculate projected billing when your customer plans to change usage patterns due to expanding facilities, changing operation hours, or adding new equipment. You can calculate the projected billing for a customer who is changing the pattern of their electrical energy use from the Rate Summary screen by selecting the New button and the current service rate or one which fits the customer's new use pattern. Select Consumption and enter the projected consumption data. The Rates worksheet screen will display your customer's projected annual billing and savings.

See also: Present your recommendations; Print your proposal.

Investigate Service Rates for New Facilities

You can use the Rates module to compare service rates for a new facility. Instead of doing a walk-around inventory as you would for a facility that's in operation, you might meet with the customer's architectural or electrical engineer. These professionals and others who are familiar with the planned operation can give you good information on the types of machinery which will be in use and their loads, as well as the shifts that will be running at the facility.

When you have the information you need, you can estimate the demand and energy levels of the customer's new facility and, using the information given to you by the customer, you can use utilities system to recommend a rate for the new facility.

When you begin recommending a service rate for a new facility you will want to: 1) Choose File: New from the menu bar. 2) Start a new presentation by clicking the OK button in the Import Accounts dialog box without having selected an account. 3) Select New and add a new account number and an account name. 4) Select New and add a new meter number. 5) Enter any identifying information you want in the Customer Information module. 6) Select Edit in the Rates module. 7) Enter the taxes and fees that are appropriate for your customer. 8) Select Consumption and enter the projected consumption data. 9) Select Rate Info and enter the voltage type and/or number of tons of air conditioning for the customer.

See also: Present your recommendations; Print your proposal.

Extension

This term refers to the "." and the last three letters at the end of a filename. An extension helps identify the type of information a file contains. For example, the files you create using Microsoft Word have the extension .DOC.

Control Panel

The Windows Control Panel allows you to visually manipulate the configuration of your system while you are using the Windows operating system. When you change a configuration in the control panel, it will be reflected the next time you run the Windows operating system.

System Configuration

System configuration is a general term which refers to system features, functionality, and resource limitations.

Presentation

The term presentation is used in two different ways when referencing utilities system. The first is an electronic file composed of the information you have selected for a specific customer. This information contains your recommendations based on factors like consumption history. The second refers to the actual verbal presentation you make to your customer. This type of presentation may include the electronic presentation you created for your customer.

TABLE 3

System Definitions

| Term | Definition |
|---|---|
| Browse icon | Use this icon to select another Graphic Overview carousel when you are in the Full Screen display mode. |
| Button | A button is a push-button-like image in a dialog box. Click on it to designate, confirm or cancel an action. |
| Capture | Capture is the procedure used to designate a Graphic Overview slide for possible inclusion in a slide show or printed proposal. Access the Capture function in the Control-menu box. |
| Carousel | A carousel is a group of graphics in the Graphic Overview module. They may be viewed individually or as part of a set. |
| Control-menu box | The control-menu box is the small box located in the upper left corner of a Windows dialog box. Use it to access the Capture and Print Screen functions in utilities system. |
| Dialog box | A dialog box is a standard item used to display messages on the screen. A dialog box often requires you to choose an option or provide information before the computer does what you want it to |
| Display icon | Use this icon to control the Graphic Overview display options when you are in the Full Screen display mode. |
| Home Base | Home base refers to the base screen of all utilities system operations. Use the Close button to return to home base from a module. |
| Icon | An icon is an image that represents a process, object, concept or message. |
| Module | A module is a portion of a program that executes a specific function. It may be used alone or combined with other modules of the same program. |
| Pause icon | Use this icon to temporarily stop the graphic display when you are in the Full Screen display mode. Click Pause again to continue viewing the graphics. |
| Proposal | A proposal is the printed document that you give your customer. |
| Scenario | A scenario is a set of alternatives being considered in a utilities system module. |
| Slide show | A utilities system slide show is a group of graphics created by the user. You may access an existing slide show or create a new slide show in utilities system. |

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A computer implemented sales system for assisting with the sale of utility products and services by generating customized reports related to how the customer can optimize its costs for utility products and services, comprising:

a receiver configured to receive data representative of customer utility usage, utility rates, and utility costs saving programs;

a memory arrangement coupled to the receiver and configured to store the data representing the customer utility usage, the utility rates, and the utility costs saving programs; and a processor coupled to the memory arrangement and configured to:
process the data representing the customer utility usage, the utility rates, and the utility costs saving programs in order to select a utility service rate and a utility costs saving program for the customer, and
generate customized reports illustrating revised customer utility costs based on applying the customer utility usage to the data representative of the selected utility service rate, and the selected utility costs saving program.

2. The computer implemented sales system of claim 1 wherein the processor is configured to output customized reports on-line.

3. The computer implemented sales system of claim 1 wherein the receiver and memory are further configured to receive and store costs saving programs comprising conservation programs.

4. The computer implemented sales system of claim 1 wherein the processor is further configured to generate customized reports which include graphs illustrating the affect the selected utility rate and the selected utility costs saving program has on the cost of utility products and services to the customer.

5. The computer implemented sales system of claim 1 wherein the receiver, memory arrangement and processor are further configured to receive, store and process data representative of customer utility usage comprising data representative of past usage of the utility by the customer in order to provide historical perspective of the customers utility usage and utility costs.

6. The computer implemented sales system of claim 1 wherein the receiver, memory arrangement and processor are further configured to receive, store and process data representative of customer utility usage comprising data representative of future usage of the utility by the customer in order to provide prospective view of utility usage and utility costs.

7. The computer implemented sales system of claim 1 wherein the receiver, memory arrangement and processor are further configured to receive, store and process data representative of customer utility usage comprising data representative of alternative use patterns of the utility by the customer in order to provide alternative perspectives of utility usage and utility costs.

8. The computer implemented sales system of claim 1 wherein the receiver, memory arrangement and processor are further configured to receive, store and process data representative of utility rates comprising utility product rates and utility service rates.

9. The computer implemented sales system of claim 1 wherein the receiver, memory arrangement and processor are further configured to receive, store and process data from an on-line connection.

10. The computer implemented sales system of claim 1 wherein the receiver, memory arrangement and processor are further configured to receive, store and process data from a data storage device.

11. The computer implemented sales system of claim 1 wherein the receiver, memory arrangement and processor are further configured to receive, store and process data concerning products or services offered by the utility company in order to generate a customized proposal for a customer comprising the customized report and a product and service report describing products or services offered by the utility company.

12. The computer implemented sales system of claim 1 including an output device provided to output the customized reports.

13. The computer implemented sales system of claim 12 wherein the output device is configured to output the customized reports in printed format or electronic format.

14. The computer implemented sales system of claim 1 wherein the receiver and memory arrangement are further configured to receive and store data representative of customer equipment inventory, and the processor is further configured to process the data representative of customer equipment inventory in order to:
select efficient customer equipment inventory comprised of at least one of replacement equipment and existing equipment, and
generate customized reports representing final revised customer utility costs based on applying to the data representative of customer utility usage, the data representative of the selected utility rate, the selected efficient customer equipment inventory and the selected utility costs saving program.

15. The computer implemented sales system of claim 14 wherein the receiver and memory arrangement are further configured to receive and store data representative of customer equipment inventory which uses the utility.

16. The computer implemented sales system of claim 14 wherein the receiver and memory arrangement are further configured to receive and store data representative of customer equipment inventory which does not use the utility.

17. The computer implemented sales system of claim 14 wherein the processor is further configured to generate customized reports comprising information describing financing costs for implementing the selected efficient customer equipment into the customer equipment inventory.

18. The computer implemented sales system of claim 14 wherein the processor is further configured to generate customized reports reflecting costs saving to the consumer resulting from implementing the selected customer equipment inventory into the customer equipment inventory.

19. The computer implemented sales system of claim 18 wherein the processor is further configured to generate customized reports reflecting utility costs savings, costs of the selected customer equipment inventory implemented and time period for cost of selected equipment payback to the customer.

20. A computer implemented sales system for assisting with the sale of utility products and services by generating customized reports related to how the customer can optimize its costs for utility products and services, comprising:
a receiver configured to receive data representative of customer utility usage, existing customer equipment inventory, utility rates, replacement equipment inventory and utility costs saving programs;
a memory arrangement coupled to the receiver and configured to store the data representing the customer utility usage, the existing customer equipment inventory, the utility rates, the replacement equipment inventory and the utility costs saving programs; and
a processor coupled to the memory arrangement and configured to:
process the information representing the customer utility usage, the existing customer equipment inventory, the utility rates, the replacement equipment inventory and the utility costs saving programs in order to select a utility service rate, a utility costs saving program, an efficient customer equipment inventory compromised of at least one of replacement equipment and existing equipment, and
generate customized reports illustrating revised customer utility costs based on applying the customer utility usage to the data representative of the selected utility service rate, the selected utility costs saving program and the selected efficient customer equipment inventory.

21. A computer implemented system for generating a customized proposal for selling utility products and services to particular customers, the system comprising:

a receiver configured to receive data representative of customer utility usage, utility rates, utility products and services, and utility costs saving programs;

a memory arrangement coupled to the receiver and configured to store the data representing the customer utility usage, the utility rates, the utility products and services and the utility costs saving programs; and a processor coupled to the memory arrangement and configured to:

process the information representing the customer utility usage, the utility rates, the utility products and services and the utility costs saving programs, in order to select at least one utility service rate, at least one utility product and service, and at least one utility costs saving program for use in generating the customized proposals for the customer, and generate the customized proposals including at least an application of the customer utility usage to the data representative of the at least one selected utility rate, the at least one utility product and service and the at least one selected utility costs saving program.

22. The computer implemented sales system of claim 21 including an output device provided to output the customized proposals.

23. The computer implemented sales system of claim 22 wherein the output device is configured to output the customized proposals on-line or in printed format or electronic format.

24. A computer system implemented method for facilitating sales of utility products and services by generating customized reports related to how the customer can optimize its costs for utility products and services, the computer system including a memory arrangement and at least one processing unit coupled to the memory arrangement, the method comprising the steps of:

receiving and storing in the memory arrangement data representing customer utility usage, utility rates, and utility costs saving programs;

selecting a utility rate and a utility costs saving program for the customer in response to processing the data representing the customer utility usage, the utility rates and the utility costs saving program; and generating customized reports illustrating revised customer costs based on applying the customer utility usage to the data representative of the selected utility rate and the selected utility costs saving program.

25. The method as recited in claim 24 further comprising the step of outputting on-line the customized reports generated.

26. The method as recited in claim 24, wherein the step of receiving and storing further comprises the step of receiving and storing cost savings programs comprising conservation programs.

27. The method as recited in claim 24 wherein the step of generating customized reports further comprises the step of generating customized reports which include graphs illustrating the affect the selected utility rate and the selected utility costs saving program has on the cost of utility products and services to the customer.

28. The method as recited in claim 24 wherein the step of receiving and storing further comprises the step of receiving and storing data representative of past customer utility usage in order to provide a historical perspective view of the customer's utility usage and utility costs.

29. The method as recited in claim 24, wherein the step of receiving and storing further comprises the step of receiving and storing data representative of future customer utility usage in order to provide a prospective view of the customer's utility usage and utility costs.

30. The method as recited in claim 24, wherein the step of receiving and storing further comprises the step of receiving and storing data representative of alternative customer utility usage patterns in order to provide alternative prospective views of the customer's utility usage and utility costs.

31. The method as recited in claim 24, wherein the step of receiving and storing further comprises the step of receiving and storing data representative of utility rates comprising product rates and utility service rates.

32. The method as recited in claim 24 further comprising the step of: receiving, storing and processing data from an on-line connection.

33. The computer system implemented method as recited in claim 24, wherein the computer system further includes a data storage device, the method further comprising the step of receiving, storing and processing data retrieved from the data storage device.

34. The method as recited in claim 24, wherein the step of receiving and storing further comprises the step of receiving and storing data concerning products and services offered by the utility company in order to generate a customized proposal for a customer comprising the customized report and a product and service report describing products or services offered by the utility company.

35. The computer system implemented method as recited in claim 24, wherein the computer system further includes an output device provided to perform the step of outputting the customized reports.

36. The method as recited in claim 35 wherein the step of outputting the customized reports further comprises the step of outputting the customized reports in printed format or electronic format.

37. The computer system implemented method as recited in claim 24 further comprising the steps of:

receiving and storing data representative of existing customer equipment inventory and replacement equipment;

selecting an efficient customer equipment inventory compiled of at least part of the existing customer equipment and at least one of the replacement equipment; and generating customized reports representing final revised customer utility costs based on applying the data representing customer utility usage, to the data representative of the selected utility rate, the selected efficient customer equipment and the selected utility costs saving program.

38. The method as recited in claim 37, wherein the step of receiving and storing further comprising the step of receiving and storing data representative of customer equipment inventory which uses the utility.

39. The method as recited in claim 37, wherein the step of receiving and storing further comprising the step of receiving and storing data representative of customer equipment inventory which does not use the utility.

40. The method as recited in claim 37 further comprising the steps of:

receiving and storing data concerning financing costs for the existing customer equipment inventory; and generating a customized report describing financing costs for implementing the selected efficient customer equipment inventory.

41. The method as recited in claim 37 further comprising the steps of:
- receiving and storing data concerning financing costs for customer equipment inventory; and
- generating a customized report reflecting costs saving to the consumer resulting from implementation of the selected efficient customer equipment inventory.

42. The method as recited in claim 37 wherein the step of generating customized reports further comprises the step of generating customized reports reflecting utility costs saving, cost of selected efficient customer equipment inventory and time period for cost of selected efficient equipment payback to the customer.

43. A computer system implemented method for facilitating sales of utility products and services by generating customized reports related to how the customer can optimize its costs for utility products and services, the computer system including a memory arrangement and at least one processing unit coupled to the memory arrangement, the method comprising the steps of:
- receiving and storing in the memory arrangement data representative of customer utility usage, existing customer equipment inventory, utility rates, replacement equipment inventory and utility costs saving programs;
- selecting a utility rate, an efficient customer equipment inventory comprised of at least one of the replacement equipment and existing equipment, and a utility costs saving program in response to processing the data representing the customer utility usage, the existing customer equipment inventory, the utility rates, the replacement equipment inventory and the utility costs saving programs; and
- generating customized reports illustrating customer costs based on applying the data representing the customer utility usage to the data representative of the selected utility rate, the selected utility costs saving program and the efficient customer equipment inventory.

44. A computer system implemented method for generating customized proposals for selling utility products and services to particular customers, the method comprising the steps of:
- receiving and storing in the memory arrangement data representing customer utility usage, utility rates, and utility costs saving programs;
- selecting, for use in generating the customized proposals, at least one utility rate and at least one utility costs saving program for the customer in response to processing the data representing the customer utility usage, the utility rates and the utility costs saving program; and
- generating customized proposals including at least an application of the customer utility usage to the data representative of the at least one selected utility rate, at least one utility product and service and the at least one selected utility costs saving program.

45. The computer system implemented method as recited in claim 44, wherein the computer system further includes an output device, the method further comprising the step of outputting the customized proposals through the output device.

46. The method as recited in claim 45 wherein the step of outputting the customized proposals further comprises the step of outputting the customized proposals in printed or electronic format.

47. A computer readable medium tangibly embodying instructions which, when executed by the computer, implement a process comprising the steps of:
- receiving into the computer and storing information representing customer utility usage, utility service rates, and utility costs saving programs;
- selecting a utility rate and a utility costs saving program for the customer in response to processing of the information representing the customer utility usage, the utility service rates and the utility costs saving program; and
- generating customized reports illustrating revised customer utility costs based on applying the customer utility usage to the data representative of the selected utility rate and the selected utility costs saving program.

48. A computer readable medium as recited in claim 47, further comprising the steps of:
- receiving into the computer and storing data representative of existing customer equipment inventory;
- selecting efficient customer equipment in response to processing of the existing customer equipment inventory; and
- generating customized reports representing efficient revised customer utility costs based on applying to the information representative of customer utility usage, the information representative of the selected utility rate, the information representative of the selected efficient customer equipment and the information representative of the selected utility costs saving program.

49. A computer readable medium as recited in claim 47, further comprising the steps of:
- receiving into the computer and storing information concerning products and services offered by the utility company; and
- generating a customized proposal for a customer comprising the customized report illustrating revised customer utility costs and a product and service report describing products or services offered by the utility company.

50. A computer readable medium as recited in claim 47, further comprising the steps of:
- receiving into the computer and storing information concerning financing costs for the existing customer equipment inventory; and
- generating a customized report describing financing costs for implementing the selected efficient customer equipment into the customer equipment inventory.

\* \* \* \* \*